United States Patent
Haag et al.

(10) Patent No.: US 12,287,436 B2
(45) Date of Patent: Apr. 29, 2025

(54) ULTRASONIC TRANSCEIVER AND PRODUCTION METHOD FOR SAME

(71) Applicant: Valeo Schalter und Sensoren GmbH, Bietigheim-Bissingen (DE)

(72) Inventors: Fabian Haag, Bietigheim-Bissingen (DE); Paul Bou Saleh, Bietigheim-Bissingen (DE); Hans Wilhelm Wehling, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 201 days.

(21) Appl. No.: 18/250,086

(22) PCT Filed: Oct. 12, 2021

(86) PCT No.: PCT/EP2021/078095
§ 371 (c)(1),
(2) Date: Apr. 21, 2023

(87) PCT Pub. No.: WO2022/084091
PCT Pub. Date: Apr. 28, 2022

(65) Prior Publication Data
US 2024/0004047 A1  Jan. 4, 2024

(30) Foreign Application Priority Data
Oct. 21, 2020  (DE) ............ 10 2020 127 643.5

(51) Int. Cl.
*G01S 7/521*  (2006.01)
*G01S 15/931*  (2020.01)

(52) U.S. Cl.
CPC ............ *G01S 7/521* (2013.01); *G01S 15/931* (2013.01)

(58) Field of Classification Search
CPC combination set(s) only.
See application file for complete search history.

(56) References Cited

U.S. PATENT DOCUMENTS

| | | | |
|---|---|---|---|
| 6,865,138 B1 * | 3/2005 | Li .................... | B60Q 9/006 340/904 |
| 7,034,743 B2 * | 4/2006 | Nakanishi .......... | G01S 7/354 342/195 |

(Continued)

FOREIGN PATENT DOCUMENTS

| | | | | |
|---|---|---|---|---|
| DE | 3826799 A1 * | 2/1990 | ............ | G01S 7/521 |
| DE | 102005009620 A1 | 8/2006 | | |

(Continued)

OTHER PUBLICATIONS

International Search Report issued in Application No. PCT/EP2021/078095 mailed on Feb. 16, 2022 (5 pages).

(Continued)

*Primary Examiner* — Daniel L Murphy
*Assistant Examiner* — Amie M Ndure
(74) *Attorney, Agent, or Firm* — Osha Bergman Watanabe & Burton LLP (57) ABSTRACT

An ultrasonic transceiver (1) for a vehicle comprises a plastics housing (2), an ultrasonic diaphragm (3), a sound transducer element (4) for stimulating vibrations and detecting vibrations of the ultrasonic diaphragm (3), and an electrically conductive contact element (6), arranged in the interior (5) of the plastics housing (2), for making electrical contact with the sound transducer element (4), wherein the plastics housing (2) and the contact element (6) are directly and positively connected to one another by caulking of at least one plastics element (8) that is formed in one piece with the plastics housing (2).

14 Claims, 5 Drawing Sheets

(56) References Cited

U.S. PATENT DOCUMENTS

| | | | | |
|---|---|---|---|---|
| 10,093,249 | B2* | 10/2018 | Ando | B60R 16/0239 |
| 10,634,544 | B1* | 4/2020 | Przybyla | G01F 23/2962 |
| 2005/0174282 | A1* | 8/2005 | Nakanishi | G01S 7/354 |
| | | | | 342/111 |
| 2006/0259213 | A1* | 11/2006 | Hashimoto | G01S 15/74 |
| | | | | 701/23 |
| 2018/0056901 | A1* | 3/2018 | Ando | B60L 15/007 |
| 2021/0096247 | A1* | 4/2021 | Ishikawa | G01S 15/325 |

FOREIGN PATENT DOCUMENTS

| | | | | |
|---|---|---|---|---|
| DE | 102016205240 B3 | 7/2017 | | |
| DE | 102017109159 A1 | 10/2018 | | |
| DE | 102018115553 A1 * | 1/2020 | | G01S 15/931 |
| EP | 1260965 A2 * | 11/2002 | | G10K 9/122 |
| JP | 2017-038270 A | 2/2017 | | |
| JP | 2017-511009 A | 4/2017 | | |

OTHER PUBLICATIONS

Written Opinon issued in Application No. PCT/EP2021/078095 mailed on Feb. 16, 2022 (5 pages).

German Search Report issued in Application No. 102020127643.5 mailed on Aug. 31, 2021 (5 pages).

Office Action issued in Corresponding JP Application No. 2023-524452, dated Jul. 2, 2024. (11 Pages with English Translation).

* cited by examiner

ULTRASONIC TRANSCEIVER AND PRODUCTION METHOD FOR SAME

The present invention relates to the field of ultrasonic sensors for vehicles and specifically to an ultrasonic transceiver for a vehicle and a production method for the same.

Ultrasonic transceivers are known with a housing, an ultrasonic membrane assembled at an opening of the housing, a transducer element adhesively bonded to the ultrasonic membrane, and a printed circuit board, with electronics for activating the transducer element, which is contacted with the transducer element by means of contact elements.

Such an ultrasonic transceiver can be used to measure a distance from an obstacle in the vehicle surroundings using the pulse echo method. The ultrasonic membrane, stimulated by the transducer element, emits energy in the form of an ultrasonic signal. The transducer element then detects vibrations of the ultrasonic membrane which originate from an echo signal returning from the vehicle surroundings. The distance from an obstacle is determined with the aid of the signal propagation delay. Such measurements are used, for example, by a parking assistance system of the vehicle.

Some of the emitted ultrasonic energy is radiated into the inside of the housing and stimulates the latter to produce undesired structural vibrations which result in the detection of false or ghost echoes. No useful measurement is therefore possible during the decay time of the structural vibrations. The distance measurement can thus have a blind range in the high decimeter range.

In order to improve the structural dynamics of an ultrasonic transceiver, the electrical contact elements can be overmolded in the plastic housing. This requires a complex injection-moulding tool and makes access more difficult when electrically contacting the contact elements with the transducer element. The contact elements can also be press-fitted in the housing. In this technique, further measures such as complete encapsulation of the housing are necessary to increase the resilience.

DE 10 2005 009 620 A1, DE 10 2017 109 159 A1, and US 2018/056901 A1 are examples of ultrasonic transceivers from the prior art.

Against this background, the object of the present invention is to provide an improved ultrasonic transceiver and an improved production method for the same.

According to a first aspect, an ultrasonic transceiver for a vehicle is proposed which has a plastic housing, an ultrasonic membrane, a transducer element for stimulating vibrations and detecting vibrations of the ultrasonic membrane, and an electrically conductive contact element, arranged in the interior of the plastic housing, for electrically contacting the transducer element, wherein the plastic housing and the contact element are connected directly and positively to each other by heat-staking of at least one plastic element which is integrally formed with the plastic housing.

The proposed ultrasonic transceiver can advantageously have improved structural dynamics. With the proposed type of connection by heat-staking of the plastic housing (of a plastic element which is integrally formed with the plastic housing) in the region of the contact element, the contact element and the plastic housing can advantageously form a rigid unit which can better absorb the vibrational energy. Trials undertaken by the inventors have shown that a shorter decay time of structural vibrations and hence a shorter blind period of the distance measurement can be obtained. Moreover, the lifetime of the ultrasonic transceiver and the long-term stability of the decay time can be increased. It is moreover possible advantageously to dispense completely or partially with encapsulating the plastic housing with silicone foam or the like whilst still achieving the above-mentioned advantages, wherein the mass of the ultrasonic transceiver can be lowered, which results in further shortening of the decay time and an improvement in the structural dynamics of the ultrasonic transceiver.

The vehicle can in particular be a motor vehicle such as a car or a truck. The vehicle can in particular be equipped with a driver assistance system and/or a parking assistance system.

Heat-staking is understood in particular to mean thermoplastic staking. Heat-staking is in particular understood to mean a procedure in which a section of the plastic element is deformed thermoplastically with the supply of heat and thus, under the action of a staking means, an at least positive, preferably frictional connection is produced between the plastic housing and the deformed plastic element and the contact element. The staking means can be a punch. Further examples for a staking means are laser radiation or infrared radiation.

The plastic element is formed integrally with the plastic housing. In particular, the plastic element and the plastic housing are formed as a continuous element by casting such as, for example, injection moulding in one working step. The plastic element is arranged in particular in the interior of the plastic housing. The plastic element can be considered as a section of the plastic housing. In particular, in the present case it is possible to refer to "heat-staking the plastic housing" or "heat-staking a section of the plastic housing", whereby "heat-staking of the plastic element" or a section thereof can be meant.

The plastic element can be, for example, an inwardly projecting protrusion of the plastic housing such as, for example, a plastic dome or the like.

In the present case, "positively connected" is understood to be a connection by interlocking or engagement from the rear by means of two connection partners.

In the present case, "directly connected" is understood to mean that no further connecting element other than the connection partners, such as a screw or the like, is used for the connection.

In particular, the plastic housing (one connection partner) and the contact element (the other connection partner) are directly connected by the plastic housing (the plastic element thus formed integrally) being suitably heat-staked.

The transducer element can in particular be a piezo element or an ultrasonic transducer. The transducer element can be adhesively bonded on the ultrasonic membrane, welded thereto, or connected to the ultrasonic membrane in a different way.

"Contact element for electrically contacting the transducer element" is to be understood in particular to mean that an electrical signal can be applied to the contact element in order to cause the transducer element to stimulate the ultrasonic membrane to vibrate in order to emit an ultrasonic signal, and/or that an electrical signal which is indicative for vibrations of the ultrasonic membrane which are detected by the transducer element can be received at the contact element in order to detect a reflected echo signal. The contact element can be contacted directly or indirectly with the transducer element. In particular, indirect contact with the transducer element is preferred for reasons of acoustic decoupling. The contact element can comprise one or more sections which can be formed as a contact pin, conductive element, conductive rail, and the like. The contact element can in particular be a metal element.

In the present case, the words "a" and "an", unless stated otherwise, are not restricted to the interpretation "precisely one" and can in particular also comprise the meaning "multiple". In particular, it should be understood that two or more contact elements can also be provided in the plastic housing which can each be connected to the plastic housing in the same way as described for "a" contact element.

According to an embodiment, there is a constraint between the plastic housing and the contact element.

The connection, produced by heat-staking the at least one plastic element, between the plastic housing and the contact element is thus preferably not only positive but also frictional. In particular, a normal force acts on the surfaces to be connected to one another of the plastic housing and of the plastic element and of the contact element. In particular, the connection between the plastic housing and the contact element is statically overdetermined. The strength of the constraint can be chosen taking into account the vibrations to be expected during operation, caused by emitted and received ultrasonic signals, driving movements of the vehicle, and the like. The presence of a suitable constraint can be checked by a pull-off test. The quality of the heat-staking can be controlled from the parameters of the heat-staking machine. It is also possible to check the quality of the heat-staking optically with a camera.

According to one embodiment, the contact element is a rigid element and an electrical contact between the contact element and the transducer element is established via a flexible intermediate element.

This means, according to the present embodiment, that the contact element contacts the transducer element indirectly via the intermediate element. The flexible intermediate element is at least more flexible than the rigid contact element. The flexible intermediate element can have a lower weight and a smaller cross-section than the rigid contact element. The flexible intermediate element can preferably be a wire. The wire can be chosen to be longer than a spacing between the contact element and the transducer element and can accordingly not be tightly stretched.

In this way, the rigid contact element can advantageously be acoustically decoupled from the vibrating ultrasonic membrane.

According to one embodiment, the at least one heat-staked plastic element comprises a protrusion which projects inward from the plastic housing, runs through a through opening in the contact element, and the free head end of which is heat-staked in such a way that it engages positively behind the contact element.

"Free head end" of the protrusion is understood in particular to mean an end of the protrusion which is remote from the plastic housing.

The present embodiment advantageously allows the contact element to positioned precisely during the production of the proposed ultrasonic transceiver. The protrusion can be introduced into the through opening and the free head end can then be widened by heat-staking in the shape of a mushroom head. A stable positive fit of the contact element between the heat-staked free head end of the protrusion and the plastic housing can thus be obtained.

According to a further embodiment, the at least one heat-staked plastic element comprises at least two protrusions which project inward from the plastic housing, wherein the contact element is arranged between the at least two protrusions, and wherein the free head ends of the protrusions are heat-staked in such a fashion that they engage positively behind the contact element.

"Free head end" of a respective protrusion is understood in particular to mean the end of the protrusion which is remote from the plastic housing.

The present embodiment can allow the contact element to positioned precisely between the two protrusions during the production of the proposed ultrasonic transceiver. The contact element can be placed between the two protrusions and its free head ends can then be widened by heat-staking. A stable fit of the contact element between the heat-staked free head ends of the two protrusions and the plastic housing can thus be obtained.

According to a further embodiment, the contact element comprises a rail-shaped section and the direct positive connection is produced between the heat-staked plastic element and the rail-shaped section.

The rail-shaped section can bear on an inner surface of the plastic housing and be enclosed positively between the inner surface of the plastic housing and the at least one heat-staked plastic element.

According to a further embodiment, the contact element comprises a pin-shaped section, and a printed circuit board with at least one electronic component for activating the transducer element is plugged onto the pin-shaped section.

Thanks to the direct positive connection, produced by heat-staking, between the contact element and the plastic housing which are acoustically decoupled by the intermediate element, a plug-on connection is advantageously sufficient between the printed circuit board and the pin-shaped section of the contact element. The plug-on connection does not need to be encapsulated. The mounting and possible repair or replacement of the printed circuit board can thus advantageously be simplified.

According to a further embodiment, the printed circuit board runs parallel to the ultrasonic membrane, a volume of the interior of the plastic housing on a side of the printed circuit board which faces the ultrasonic membrane is encapsulated with a foam, and a volume of the interior on a side of the printed circuit board which faces away from the ultrasonic membrane is not encapsulated with foam.

The foam can, for example, be a silicone foam. The volume of the interior of the plastic housing on the side which faces the ultrasonic membrane can be completely or partially encapsulated with the foam. In particular, a volume region of the plastic housing which adjoins the ultrasonic membrane can be encapsulated with foam. The ultrasonic membrane can thus be damped advantageously At the same time, at least a volume region of the plastic region on the side of the printed circuit board which faces away from the ultrasonic membrane has no foam. Optionally, a part of the volume region on the side which faces the ultrasonic membrane also has no foam. In particular, according to the proposed solution, there is no need to encapsulate the connection between the printed circuit board and the pin-shaped section of the contact element. It is likewise not necessarily required to encapsulate the connection between the rail-shaped section of the contact element and the plastic housing.

A saving can thus advantageously be made in encapsulating compound and the mass of the ultrasonic transceiver can be reduced. This can have an advantageous effect on the structural dynamics and in particular on the decay time of the ultrasonic transceiver.

According to a second aspect, a method for producing an ultrasonic transceiver for a vehicle is proposed. The method comprises the steps: forming a plastic housing with at least one plastic element integrally formed with the plastic housing; fastening an ultrasonic membrane with a transducer element in order to stimulate vibrations and detect vibrations of the ultrasonic membrane on the plastic housing; arranging an electrically conductive contact element in the interior of the plastic housing; contacting the contact element with the transducer element; and directly and positively connecting the plastic housing to the contact element by heat-staking the at least one plastic element integrally formed with the plastic housing.

The features, advantages, definitions, and embodiments described above for the ultrasonic transceiver of the first aspect also apply correspondingly to the production method of the second aspect. The features, advantages, definitions, and embodiments described below for the production method of the second aspect also apply correspondingly to the ultrasonic transceiver of the first aspect.

The proposed production method can advantageously offer improved access and consequently simplify the mounting. An injection-moulding tool for casting the plastic housing can thus be designed more compactly and simply and the contacting of the contact element with the transducer element can take place at least partially with considerably greater freedom of movement already before the arrangement of the contact element in the plastic housing and before the connection of the plastic housing to the contact element. A wire can, for example, be soldered to the contact element as an intermediate element already before the arrangement of the contact element in the plastic housing.

The forming of the plastic housing with the plastic element which is integrally formed with the latter can comprise casting, such as for example injection molding, in one working step.

The fastening of the ultrasonic membrane to the transducer element can in particular comprise the following steps: adhesively bonding the transducer element onto the ultrasonic membrane; and assembling the ultrasonic membrane with the transducer element on the housing.

The arrangement of the contact element can comprise in particular placing the contact element on an inner surface of the plastic housing.

The contacting of the contact element with the transducer element can in particular comprise soldering.

The heat-staking of the at least one plastic element can in particular comprise in particular a thermoplastic deformation of the at least one plastic element with the supply of heat, in such a fashion that, after cooling of the plastic, a positive connection exists between the plastic housing, the heat-staked plastic element, and the contact element.

According to one embodiment, the plastic housing is formed integrally with the at least one plastic element which comprises at least one protrusion which projects inward from the plastic housing and has a lead-in slope at its free head end, and the contact element is guided and positioned by the lead-in slope during arrangement in the interior of the plastic housing.

The lead-in slope can be formed, for example, by a beveled upper edge of a cuboid protrusion. The lead-in slope can also be formed by a conical tip of a cylindrical protrusion.

The lead-in slope can advantageously assist the positioning of the plastic element during the preferably automatically performed arrangement in the plastic housing.

According to one embodiment, the at least one plastic element which is integrally formed with the plastic housing comprises a plurality of protrusions which project inward from the plastic housing, have a respective lead-in slope at their free head ends, and together form a pocket, wherein the arrangement of the electrically conductive contact element in the interior of the plastic housing comprises inserting the contact element into the pocket, wherein the contact element is guided and positioned by the lead-in slopes during the insertion.

"Pocket" is understood in particular to mean an essentially cuboid volume which is defined by the plastic housing and the respective protrusions and is formed with a precise fit in conformity with the contact elements to be inserted into the pocket. The volume referred to as a "pocket" is not necessarily completely surrounded by plastic elements and instead can have gaps on each of its sides.

During the production of the ultrasonic transceiver, in this way the contact element can be inserted simply, in particular automatically by a robot arm, into the pocket formed by the protrusions and thus be positioned precisely by the lead-in slopes at the free head ends of the protrusions automatically and preferably in all degrees of freedom apart from the direction of the insertion.

According to a further embodiment, the contact element is a rigid element and an electrical contact between the contact element and the transducer element is established via a flexible intermediate element.

Accordingly, the contact element can advantageously be acoustically decoupled from the transducer element and hence also from the ultrasonic membrane.

According to a further embodiment, the contacting of the contact element with the transducer element comprises soldering or welding one end of the flexible intermediate element to the contact element before the arrangement of the contact element in the plastic housing, and soldering or welding the other end of the flexible intermediate element to the transducer element after the arrangement of the contact element in the plastic housing.

Because the connection of the contact element to the plastic housing is effected by heat-staking a plastic element, the soldering or welding of at least one end of the flexible intermediate element can take place before the arrangement of the contact element, where advantageously there is a greater degree of freedom, which enables more precise working.

According to a further embodiment, the soldering or the welding of the other end of the flexible intermediate element to the transducer element and the heat-staking of the at least one plastic element take place at the same time in one working step.

According to a further embodiment, the contacting of the contact element with the transducer element comprises soldering or welding one end of the flexible intermediate element to the contact element and soldering or welding the other end of the flexible intermediate element to the transducer element after the heat-staking of the plastic element in order to connect the contact element to the plastic housing.

The proposed connection of the contact element and the plastic housing by heat-staking makes the use of complex injection-molding tools or the like superfluous and can take place in a space-saving fashion such that a soldering tool can also be introduced into the plastic housing at the same time as a punch for heat-staking, or a combination tool for soldering and heat-staking can be used. The energy and time required during the mounting of the ultrasonic transceiver can thus be reduced advantageously.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is furthermore explained in more detail below on the basis of preferred exemplary embodiments with reference to the accompanying figures.

Identical or functionally identical elements have been provided with the same reference signs in the figures, unless stated otherwise.

Figure 1:
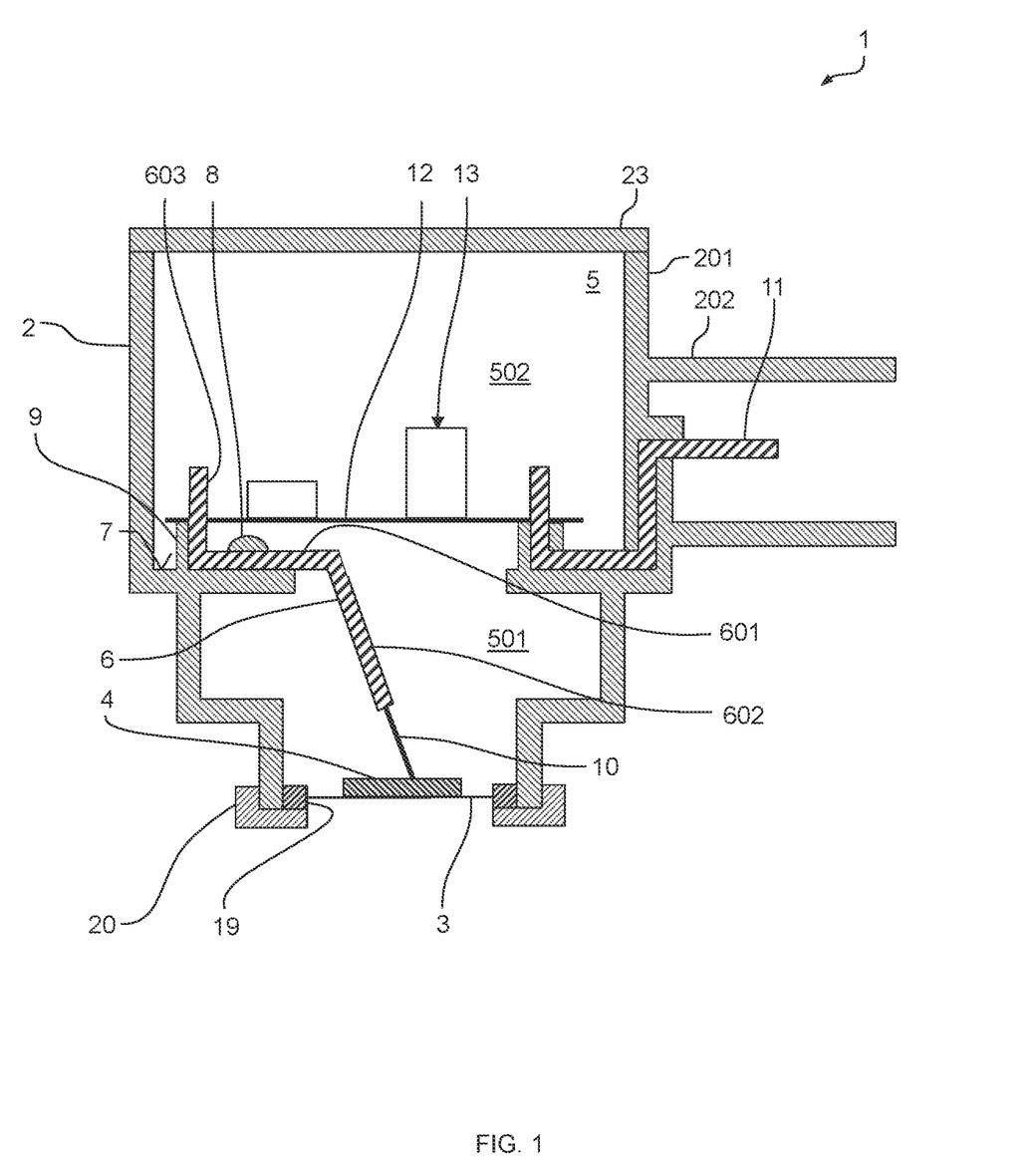
FIG. 1 shows a schematic view in section of an ultrasonic transceiver according to a first exemplary embodiment.

FIG. 1 shows a schematic view in section, not to scale, of an ultrasonic transceiver 1 according to a first exemplary embodiment.

The ultrasonic transceiver 1 comprises a plastic housing 2. An ultrasonic membrane 3 for emitting and receiving ultrasonic signals is assembled in an open underside of the plastic housing 2. A piezo element 4 (an example of a transducer element) is adhesively bonded onto the ultrasonic membrane 3. The piezo element 4 is configured to stimulate, controlled by an electrical signal, the ultrasonic membrane 3 to vibrate and is configured to detect vibrations of the ultrasonic membrane 3 and convert them into an electrical signal. An electrically conductive contact element 6 for contacting the piezo element 4 is arranged in the interior 5 of the plastic housing 2. A horizontal section 601 of the contact element 6 rests on an inner surface 7 of the plastic housing 2. The contact element 6 (the horizontal section 601) is connected directly and positively to the plastic housing 2 by a free head end of a plastic element 8, which is formed integrally with the plastic housing 2, being heat-staked (indicated by the shape of a mushroom head by way of example in FIG. 1).

It should be noted that the plastic element 8 is likewise considered as a section of the plastic housing 2 because it is integrally formed with the plastic housing 2. In other words, the plastic housing 2 is heat-staked in a region of the contact element 6 in such a fashion that sections 7, 8 of the plastic housing 2 and the contact element 6 are connected to each other directly and positively.

The ultrasonic transceiver 1 has advantageous structural dynamics, a reduced decay time of structural vibrations, an increased lifetime, and a greater long-term stability of the decay time.

Advantageous configurations and developments of the ultrasonic transceiver 1 are further described with reference to FIG. 1.

In particular, there is a constraint between the plastic housing 2, in particular between the inner surface 7 and the heat-staked free end of the plastic element 8, and the contact element 6 (section 601). On the one hand, because of manufacturing tolerances, it can be difficult to achieve static determinacy of the connection between the plastic housing 2 and the contact element 6. Static determinacy can be ensured by selecting an at least slight constraint. On the other hand, the connection between the plastic housing 2 and the contact element 6 can thus be formed not only positively but also frictionally.

In particular, the contact element 6 connected at least positively to the plastic housing 2 is not connected directly to the piezo element 4. A flexible thin wire 10 (an example of an intermediate element) is arranged between the rigid contact element 6 and the piezo element 4. The wire 10 serves to acoustically decouple the contact element 6 from the ultrasonic membrane 3.

In particular, the ultrasonic membrane 3 is not connected directly to the plastic housing 2. The ultrasonic membrane 3 is attached, for example, in a decoupling ring 19 (also referred to as a "plug"). The module consisting of the ultrasonic membrane 3, the piezo element 4, and the decoupling ring 19 is arranged internally in an open side of the plastic housing 2 and is assembled on the plastic housing 2 by means of an external annular cover 20. The connection of the cover 20 and the plastic housing 2 can be laser-welded. Acoustic decoupling of the plastic housing 2 from the ultrasonic membrane 3 with the piezo element 4 can be obtained in such a fashion.

In particular, the horizontal section 601 connected positively to the plastic housing 2 is a conductive rail section (rail-shaped section) which bears flat on the inner surface 7 of the plastic housing 2. The contact element 6 moreover comprises a further conductive rail section 602 which runs obliquely downward in the direction of the piezo element 4. The contact element 6 moreover comprises a contact pin section 603 (pin-shaped section) which runs upward, essentially orthogonally with respect to the conductive rail section 601. The contact pin section 603 which runs vertically upward bears with a precise fit on a protrusion 9 which is not heat-staked, is integrally formed with the plastic housing 2, and projects inward.

In the present case, "down" refers to a direction along a main axis of the ultrasonic transceiver 1 in which its ultrasonic signals are emitted, and "up" refers correspondingly to the opposite direction. It should be understood that the ultrasonic transceiver 1 can be assembled on a vehicle in any desired orientation and that the "downward" direction does not necessarily or preferably need to coincide with the direction of gravity neither during the production of the ultrasonic transceiver 1 nor during the operation of the ultrasonic transceiver 1.

In particular, the ultrasonic transceiver 2 has a further contact pin 11 for external contacting which leads out of a main housing section 201 of the plastic housing 2 into a coupling housing section 202 of the plastic housing 2 and serves for external contacting. A section of the further contact pin 11 projects upward in the main housing section 201 of the plastic housing, on a side situated opposite the contact pin section 603 of the contact element 6, and parallel to said contact pin section.

A printed circuit board 12 is plugged from above onto the contact pin section 603 of the contact element 6 for contacting the piezo element 4 and onto the vertical section of the further contact pin 11 for external contacting. One or more electronic components 13 for activating the piezo element 4 are arranged on the printed circuit board 12.

In particular, a volume 501 of the interior 5 of the plastic housing 2 can preferably be at least partially encapsulated with a silicone foam on a side of the printed circuit board 12 facing the ultrasonic membrane 3. Particularly preferably, the volume 501 can be encapsulated with the silicone foam starting from the ultrasonic membrane 3 up to a height which is sufficient to ensure sufficient damping of the ultrasonic membrane 3 but lies below the printed circuit board 12. In particular, it is advantageously not necessary to encapsulate with the silicone foam the connection, formed by heat-staking, between the conductive rail section 601 of the contact element 6 and the heat-staked plastic element 8. It is likewise not necessary to encapsulate with the silicone foam the plug-on connection between the contact pin section 603 of the contact element 6 and the printed circuit board 12. In particular, a volume 502 on a side of the printed circuit board 12 facing away from the ultrasonic membrane 3 is not encapsulated with foam. In this way, the quantity of silicone foam used can thus advantageously be reduced to the minimum required for damping the ultrasonic membrane 3 compared with complete encapsulation of the plastic housing 2. As a result, the total mass of the ultrasonic transceiver 1 can be reduced, which can have an advantageous effect on the structural dynamics and the decay time of structural vibrations.

A production method for an ultrasonic transceiver 1, and an ultrasonic transceiver 1 according to a second exemplary embodiment, are described below with the aid of FIGS. 2 to 5. The second exemplary embodiment is compatible with the first exemplary embodiment. The same elements have the same reference signs and are not described again.

Figure 2:
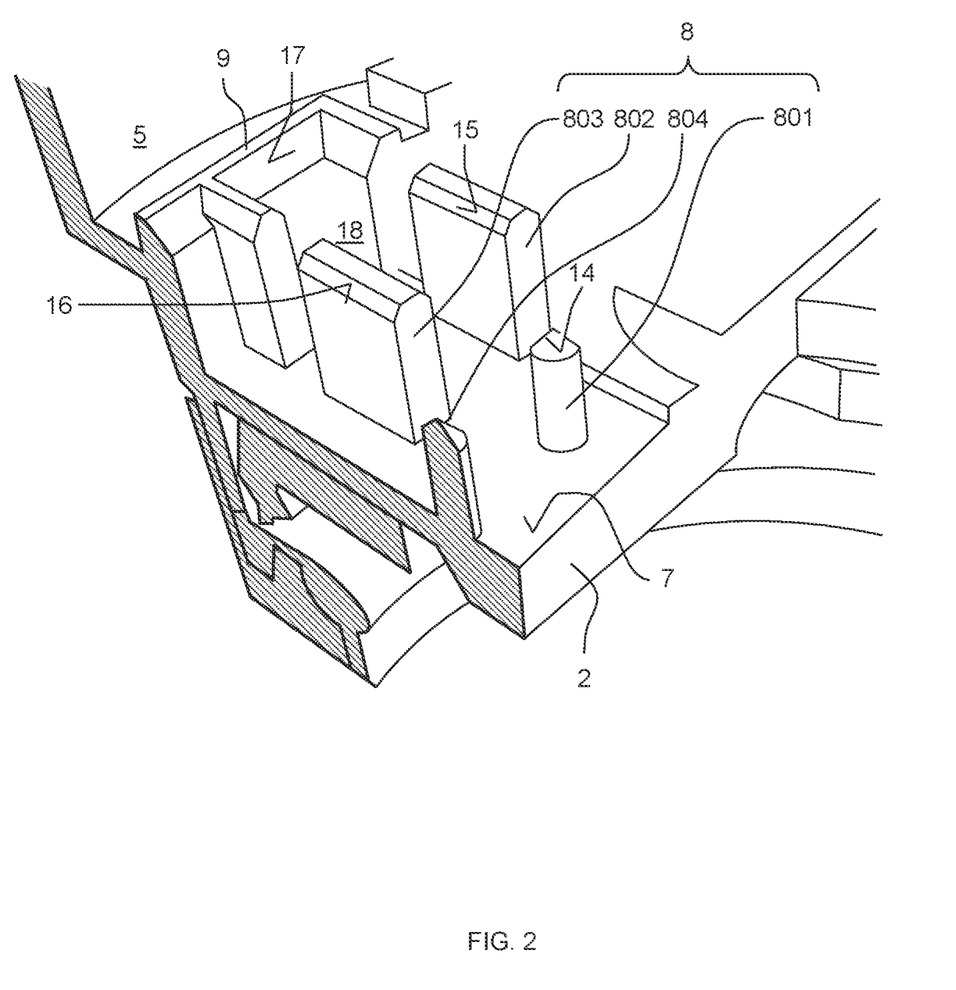
FIG. 2 shows a perspective portion of a plastic housing before the insertion and connection of the contact elements according to a second exemplary embodiment.
Figure 3:
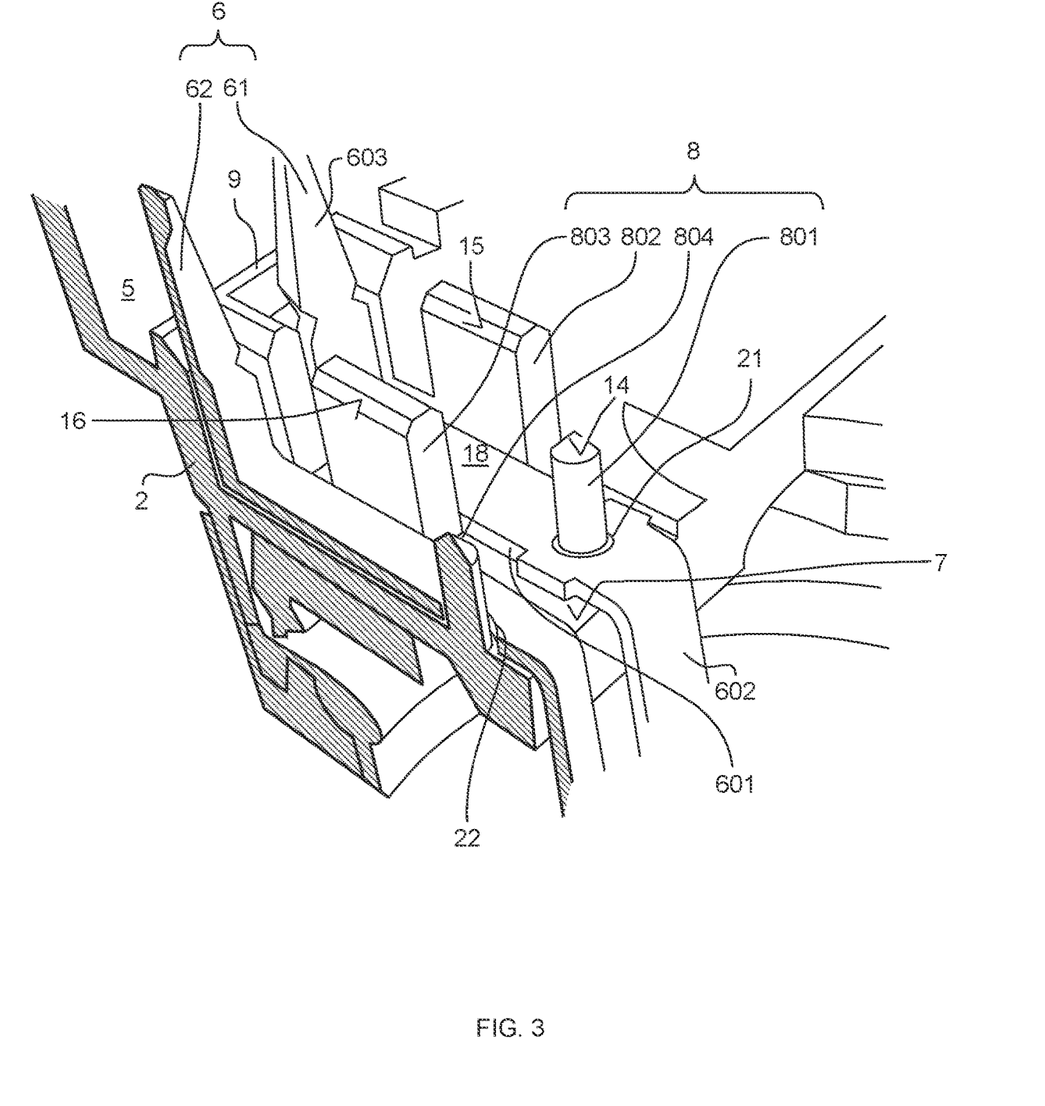
FIG. 3 shows a perspective portion of the plastic housing from FIG. 2 with inserted contact elements.
Figure 4:
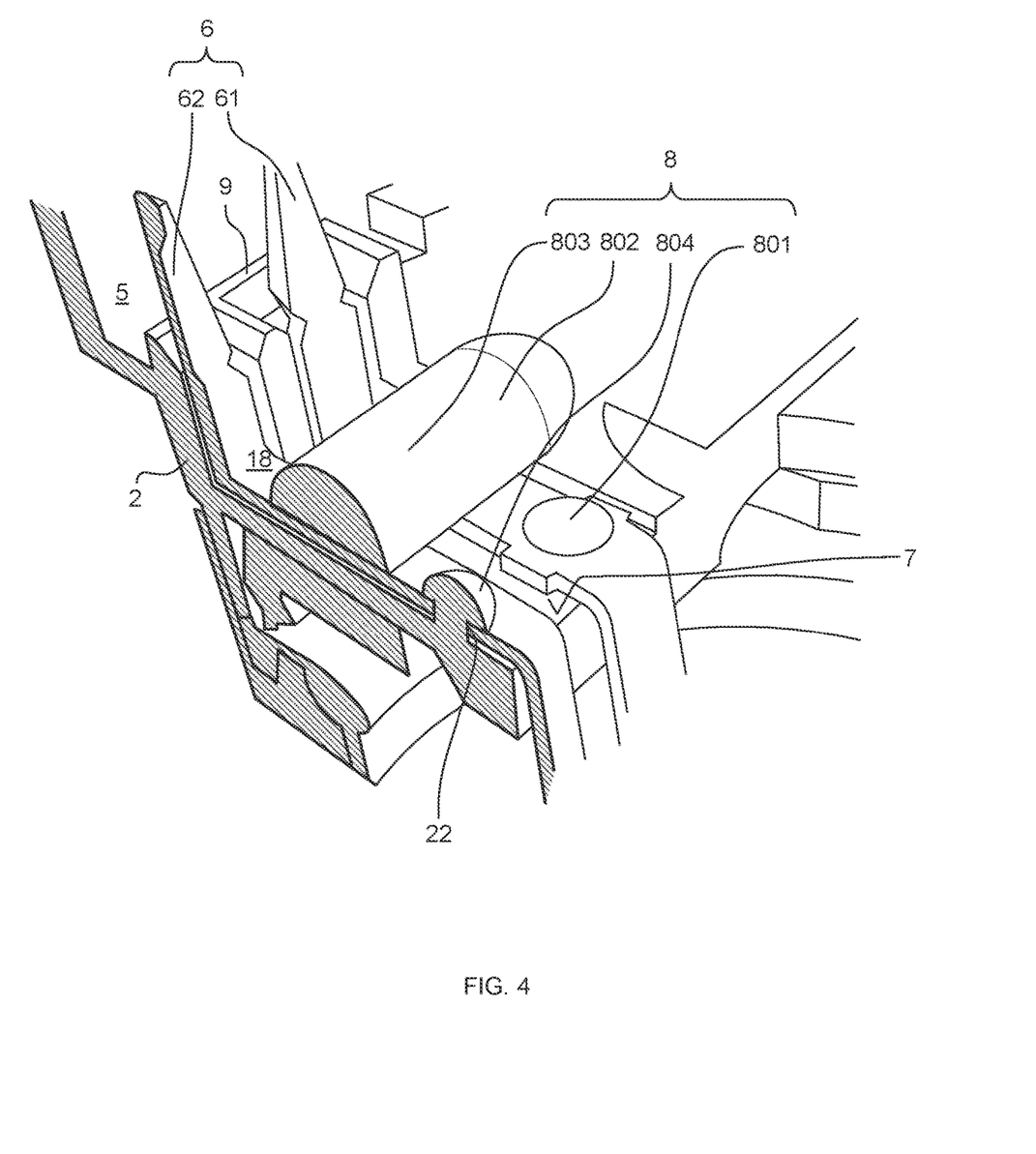
FIG. 4 shows a perspective portion of the plastic housing from FIG. 3 after the heat-staking.
Figure 5:
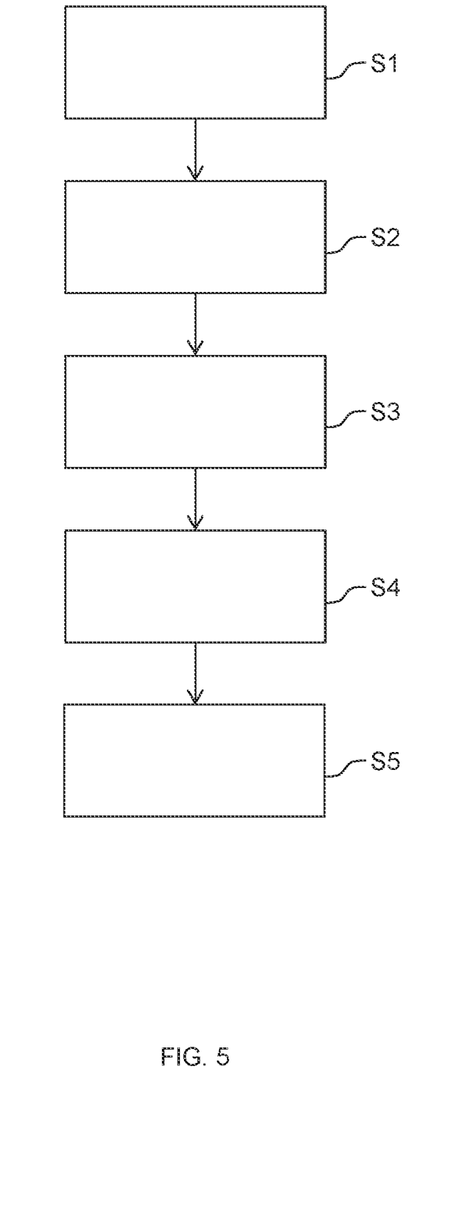
FIG. 5 shows steps of a production method according to an exemplary embodiment.

FIGS. 2, 3, and 4 show perspective and essentially true-to-scale portions of a plastic housing 2 before the insertion and connection of the contact elements 61, 62 (FIG. 2), with inserted contact elements 61, 62 (FIG. 3), and after heat-staking (FIG. 4). FIG. 5 illustrates steps of a production method.

In step S1, the plastic housing 2 is formed as a single piece in an injection-molding process. The plastic housing 2 has an inner surface 7 from which protrusions 8 and 9, formed integrally with the plastic housing 2, project vertically inward. The protrusions 801, 802, 803, 804 are examples of the at least one plastic element 8 to be heat-staked. The protrusion 9 is a protrusion which is not to be heat-staked.

Each of the protrusions 8, 9 has a respective lead-in slope 14-17 at its free head end (the end remote from the inner surface 7 of the plastic housing). Specifically, the column-like protrusion 801 has a conical tip which serves as a lead-in slope 14. At their free head ends, the wall-shaped (cuboid) protrusions 802 and 803 have beveled edges 15, 16 which serve as respective lead-in slopes. At its free head end, the wall-shaped protrusion 9 which is not to be heat-staked has a beveled edge 17 which serves as a lead-in slope.

The column-shaped protrusion 801, the wall-shaped protrusions 802, 803, and the protrusion 9 which is not to be heat-staked together form a pocket 18. The pocket 18 represents a volume region into which a contact element (61 in FIG. 3) can be inserted and which is surrounded by different plastic elements 7, 9, 14, 15, 18 which, as described below, are heat-staked in order to establish a direct and positive connection to the contact element 61.

The step S2 is described with reference to FIG. 5 and FIG. 1. In step S2, the ultrasonic membrane 3 with the piezo element 4 is fastened to the plastic housing 2. In particular, the piezo element 4 is adhesively bonded onto the ultrasonic membrane 3. The ultrasonic membrane 3 is attached in a decoupling ring 19. The module consisting of the ultrasonic membrane 3, the piezo element 4, and the decoupling ring 19 is arranged internally in an open side of the plastic housing 2 and is assembled on the plastic housing 2 from outside by means of an external cover 20. The connection between the external cover 20 and the plastic housing 2 is laser-welded.

Reference is now made to FIGS. 3 and 5. In step S3, the contact elements 61, 62 are inserted into the pocket 18 and consequently arranged in the interior 5 of the plastic housing 2. During the insertion, the contact element 61 is guided by the lead-in slopes 14-17 and positioned precisely in all degrees of freedom apart from the direction of insertion.

The contact element 61 is described by way of example. It should be understood that the contact element 62 is constructed in the same fashion. The contact element 61 has the contact pin section 603 which runs vertically upward, the conductive rail section 601 which rests on the inner surface 7 of the plastic housing 2, and the conductive rail section 602 which runs obliquely downward in the direction of the ultrasonic membrane 3 (FIG. 1). The conductive rail section 601 has a through opening 21 through which the column-shaped protrusion 801 runs with a precise fit after the insertion of the contact element 61. The conductive rail section 601 is positioned with a precise fit between the two wall-shaped protrusions 802 and 803 during the insertion. In addition, a rear side of the contact pin section 603, which runs vertically upward, of the contact element 61 comes to bear with a precise fit on the protrusion 9 which is not to be heat-staked.

The step S4 is described with reference to FIG. 5 and FIG. 1. In step S4, the contact elements 6 are contacted with the piezo element 4. Step S4 does not necessarily need to take place after step S3 and/or before step S5 and instead can take place in full or in part at one or many other points in time. For example, one end of the wire 10 can advantageously already be soldered to one end of the section 602, which runs obliquely downward, of the respective contact element 6 before the insertion in step S3. After the insertion in step S3, the other end of the wire 10 can then be soldered to the piezo element 4 and the contacting of the respective contact element 6 with the piezo element 4 completed as a result. Particularly preferably, the heat-staking described below of the protrusions 801-804 in step S5 and the soldering of the wire 10 to the piezo element 4 can take place at the same time in one working step by a punch for the heat-staking and a soldering tool being introduced simultaneously into the plastic housing 2 or a combination tool being used for the heat-staking and soldering.

Reference is now made to FIG. 3 to FIG. 5. In step S5, the free ends of the protrusions 801, 802, 803, 804 (FIG. 3) are heat-staked and as a result a direct and positive, advantageously also frictional, connection of the plastic housing 2 to the contact elements 61, 62 is obtained. This results in the configuration shown in FIG. 4. It can be seen in FIG. 4 with the second contact element 62 that the column-shaped protrusion 804 projects through the through opening 22 of the contact element 22, and the free end of the protrusion 804 is heat-staked in such a fashion that it engages positively behind the contact element 62. The same applies for the column-shaped protrusion 801 and the contact element 61. Moreover, the free ends of the protrusions 802, 803 which are arranged on either side of the contact element 61 and are melted during the heat-staking to form a common heat-staked head end of the two protrusions 802 and 803 engage positively behind the contact element 61. The contact element 61 is furthermore positioned with a precise fit in the pocket 18 formed by the protrusions 801, 802, 803 and deformed during the heat-staking and is consequently connected directly and positively to the plastic housing 2.

The production method can comprise further steps not illustrated in FIG. 5. Reference is made to FIG. 1. In particular, a pull-off test can be performed in a further step in order to ascertain whether the connection between the contact elements 6 and the plastic housing 2 is sufficiently statically overdetermined and frictional. In particular, a volume 501 of the plastic housing 2 can then be encapsulated partially with silicone foam on one side of the ultrasonic membrane 3 in order to damp the ultrasonic membrane. According to the proposed solution, it is, however, not necessary here to completely encapsulate the contact elements 6, 61, 62. The printed circuit board 12 can then be plugged onto the contact pin section 603 and the vertical section of the contact pin 11 for external contacting. Here too there is advantageously no need for encapsulation. Lastly, an upper side of the plastic housing 2 can be closed with a cover 23. The connection between the cover 23 and the plastic housing 2 can, for example, be laser-welded.

Although the present invention has been described on the basis of exemplary embodiments, it may be modified in many ways. In particular, plastic sections of the plastic housing 2 which are shaped and arranged in any desired fashion can be heat-staked as long as a direct positive connection is established as a result between the plastic housing 2 and the contact element 6.

LIST OF REFERENCE SIGNS 1 ultrasonic transceiver
2 plastic housing
3 ultrasonic membrane
4 transducer element, piezo element
5 interior of the plastic housing
6 contact element
7 inner surface of the plastic housing
8 plastic element
9 non-heat-staked protrusion
10 intermediate element, wire
11 contact pin for external contacting
12 printed circuit board
13 electronic components
14-17 lead-in slopes
18 pocket
19 decoupling ring
20 cover
21, 22 through opening
23 cover
61, 62 contact element
201 main housing section
202 coupling housing section
501, 502 volumes in the interior of the plastic housing
601 horizontal section of the contact element, conductive rail section
602 conductive rail section, running obliquely downward, of the contact element
603 contact pin section of the contact element
801, 804 column-shaped protrusion
802, 803 cuboid and wall-shaped protrusion

The invention claimed is:

1. An ultrasonic transceiver for a vehicle, wherein the ultrasonic transceiver comprises:
a plastic housing;
an ultrasonic membrane;
a transducer element for stimulating vibrations and detecting vibrations of the ultrasonic membrane; and
an electrically conductive contact element, arranged in the interior of the plastic housing, for electrically contacting the transducer element,
wherein the plastic housing and the contact element are connected directly and positively to each other by heat-staking of at least one plastic element which is integrally formed with the plastic housing.

2. The ultrasonic transceiver as claimed in claim 1, wherein there is a constraint between the plastic housing and the contact element.

3. The ultrasonic transceiver as claimed in claim 1, wherein the contact element is a rigid element and an electrical contact between the contact element and the transducer element is established via a flexible intermediate element.

4. The ultrasonic transceiver as claimed in claim 1, wherein the at least one heat-staked plastic element comprises a protrusion which projects inward from the plastic housing, runs through a through opening in the contact element, and the free head end of which is heat-staked in such a fashion that it engages positively behind the contact element.

5. The ultrasonic transceiver as claimed in claim 1, wherein the at least one heat-staked plastic element comprises at least two protrusions which project inward from the plastic housing, wherein the contact element is arranged between the at least two protrusions, and wherein the free head ends of the protrusions are heat-staked in such a fashion that they engage positively behind the contact element.

6. The ultrasonic transceiver as claimed in claim 1, wherein the contact element comprises a rail-shaped section and the direct positive connection is established between the at least one heat-staked plastic element and the rail-shaped section.

7. The ultrasonic transceiver as claimed in claim 1, wherein the contact element comprises a pin-shaped section, and a printed circuit board with at least one electronic component for activating the transducer element is plugged onto the pin-shaped section.

8. The ultrasonic transceiver as claimed in claim 7, wherein the printed circuit board runs parallel to the ultrasonic membrane, a volume of the interior of the plastic housing on a side of the printed circuit board which faces the ultrasonic membrane is encapsulated at least partially with a foam, and a volume of the interior on a side of the printed circuit board which faces away from the ultrasonic membrane is not encapsulated with foam.

9. A method for producing an ultrasonic transceiver for a vehicle comoprising:
forming a plastic housing with at least one plastic element integrally formed with the plastic housing;
fastening an ultrasonic membrane with a transducer element to stimulate vibrations and detect vibrations of the ultrasonic membrane on the plastic housing;
arranging an electrically conductive contact element in the interior of the plastic housing;
contacting the contact element with the transducer element; and
directly and positively connecting the plastic housing to the contact element by heat-staking the at least one plastic element integrally formed with the plastic housing.

10. The method as claimed in claim 9, wherein the plastic housing is formed integrally with the at least one plastic element which comprises at least one protrusion which projects inward from the plastic housing and has a lead-in slope at its free head end,
wherein the contact element is guided and positioned by the lead-in slope during arrangement in the interior of the plastic housing.

11. The method as claimed in claim 10, wherein the at least one plastic element which is integrally formed with the plastic housing comprises a plurality of protrusions which project inward from the plastic housing, have a respective lead-in slope at their free head ends, and together form a pocket, wherein the arrangement of the electrically conductive contact element in the interior of the plastic housing comprises inserting the contact element into the pocket, wherein the contact element is guided and positioned by the lead-in slopes during the insertion.

12. The method as claimed in claim 9, wherein the contact element is a rigid element and an electrical contact between the contact element and the transducer element is established via a flexible intermediate element.

13. The method as claimed in claim 12, wherein the contacting of the contact element with the transducer element comprises:
   soldering one end of the flexible intermediate element to the contact element before the arrangement of the contact element in the plastic housing;
   soldering the other end of the flexible intermediate element to the transducer element after the arrangement of the contact element in the plastic housing.

14. The method as claimed in claim 13, wherein the soldering of the other end of the flexible intermediate element to the transducer element and the heat-staking of the at least one plastic element take place at the same time in one working step.

\* \* \* \* \*